(12) United States Patent
Saelen

(10) Patent No.: US 11,020,893 B2
(45) Date of Patent: Jun. 1, 2021

(54) THERMOFORMING MOLD DEVICE AND A PROCESS FOR ITS MANUFACTURE AND USE

(71) Applicant: REYDEL AUTOMOTIVE B.V., Kn Baarn (NL)

(72) Inventor: Marc Saelen, Allennes les Marais (FR)

(73) Assignee: REYDEL AUTOMOTIVE B.V., KN Baarn (NL)

( * ) Notice: Subject to any disclaimer, the term of this patent is extended or adjusted under 35 U.S.C. 154(b) by 198 days.

(21) Appl. No.: 15/985,309

(22) Filed: May 21, 2018

(65) Prior Publication Data

US 2018/0264709 A1    Sep. 20, 2018

Related U.S. Application Data

(62) Division of application No. 14/734,322, filed on Jun. 9, 2015, now Pat. No. 10,000,006.

(30) Foreign Application Priority Data

Jun. 12, 2014  (FR) ...................................... 1455347

(51) Int. Cl.
*B29C 51/10* (2006.01)
*B29C 51/36* (2006.01)
(Continued)

(52) U.S. Cl.
CPC ............ *B29C 51/36* (2013.01); *B29C 51/082* (2013.01); *B29C 51/087* (2013.01); *B29C 51/10* (2013.01); *B60R 13/02* (2013.01); *B29C 2791/006* (2013.01); *B29K 2101/12* (2013.01); *B29K 2105/256* (2013.01);
(Continued)

(58) Field of Classification Search
CPC ..... B29C 51/36; B29C 51/082; B29C 51/085; B29C 51/087; B29C 51/10
See application file for complete search history.

(56) References Cited

U.S. PATENT DOCUMENTS

2017/0165897 A1    6/2017  Saelen

FOREIGN PATENT DOCUMENTS

| EP | 0629485 A2 | 12/1994 |
| EP | 09131785 | 5/1997 |

(Continued)

OTHER PUBLICATIONS

Database WPI, Week 199730 Thomson Scientific, London, GB; AN 1997-327806 XP002728859, & JP H09 131785 A, May 20, 1997.

*Primary Examiner* — Ryan M Ochylski
(74) *Attorney, Agent, or Firm* — Dickinson Wright PLLC

(57) ABSTRACT

A thermoforming mold device (1) providing a piece with a thin wall starting with a sheet of thermoplastic material is provided. At least one (3) of two parts of the mold (3, 3') comprises at least one means (4) of local deformation of a sheet (2') in the mold (3, 3') in its closed state, the at least one means (4) comprises a piece of hollow molding with a peripheral edge, which can be connected selectively to a source of suction and can be displaced between a folded position, in which the molding piece is situated in close proximity with the wall of the thermoformed piece, and a deployed position, in which the molding piece is applied under pressure with its peripheral edge against the wall of the thermoformed piece upholding the other part of the mold.

5 Claims, 6 Drawing Sheets

(51) Int. Cl.
    *B29C 51/08*       (2006.01)
    *B60R 13/02*       (2006.01)
    *B29L 31/30*        (2006.01)
    *B29K 101/12*      (2006.01)
    *B29K 105/00*      (2006.01)

(52) U.S. Cl.
    CPC .................. *B29L 2031/3005* (2013.01); *B29L 2031/3041* (2013.01); *Y10T 428/24628* (2015.01)

(56) References Cited

FOREIGN PATENT DOCUMENTS

| | | | | |
|---|---|---|---|---|
| EP | 1110699 | A1 | 6/2001 | |
| FR | 2883795 | A1 * | 10/2006 | ........... B29C 51/261 |
| WO | 2007101868 | A2 | 9/2007 | |

\* cited by examiner

THERMOFORMING MOLD DEVICE AND A PROCESS FOR ITS MANUFACTURE AND USE

CROSS-REFERENCE TO RELATED APPLICATIONS

This U.S. divisional patent application claims priority to U.S. Utility patent application Ser. No. 14/734,322 filed Jun. 9, 2015 which claims priority to French Application No. FR 1455347 filed Jun. 12, 2014, the entire contents of which are hereby incorporated by reference.

BACKGROUND OF THE INVENTION

1. Technical Field

The present invention relates to the domain of realisation of trim elements or elements of inner lining of automobile vehicles, in particular elements of this type comprising or constituted by a sheet or plate of thermoplastic material, formed in adapted manner and optionally presenting a raised pattern formed in the mass.

More specifically, the object of the invention is a mold device for the manufacturing by molding under negative pressure of pieces, starting from the sheets or the plates, and a manufacturing process using this device.

2. Related Art

Various processes for the manufacturing of pieces by molding under negative pressure (better known under the English name "Negative Vacuum Forming") are already known in the state of the art (see, for example: FR 2 900 862, US 2013/0221698).

Generally, in this type of process, a sheet or a plate of plastic material is preheated and then placed between two parts of the mold (or half molds) which preforms it during the closure and, after the complete closure of the mold, relative vacuum is applied at the level of the part of the mold that comes into contact with the visible face of the piece in order to realise the definitive molding of the piece. Eventually, during the application of pressure, due to the surface aspiration, a raised pattern or graining is realised on the visible surface (negative pattern that is present on the part of the mold subjected to suction).

This method of molding by vacuum has many advantages among which, in particular, is the excellent quality of the pattern and the deformations that the visible surface must have, as well as their precise localisation.

Nonetheless, when the pattern has to be changed, even locally, and/or if one or several particular deformations have been foreseen, for example, for different versions of the same piece, it is necessary to have the same number of mold parts (at least for the visible face) as the versions of the piece, even if certain of these versions distinguish themselves from each other only by minor or local differences (modification of the height or the form of a given reinforcement of the accommodation of a given accessory, management of the presence/absence of locally deformed zones, creation of drafts of the mounting or anchoring zones of the equipment or the salient decorative elements, . . . )

In addition, the necessary replacement of the parts of the mold between two phases of the manufacturing of different versions of the same piece leads to a fall in the efficiency and productivity of the equipment and the personnel and requires the acquisition of specific means permitting to make a rapid change in the parts of the mold.

SUMMARY OF THE INVENTION

The present invention has, namely, the objective to mitigate the aforementioned inconveniences.

To this effect, it has as objective a thermoforming mold device for the realisation of a thin-wall piece starting from a sheet of thermoplastic material, the mold device comprising two parts of a mold with working surfaces with forms, which are substantially complementary and at least one of their parts is mobile in a way to define an opening state and a closing state of the mold, with one of the two parts of the mold comprising means of suction for pressing the sheet against its surface and the cavity formed between the two parts of the mold being substantially sealed hermetically in the closed state of the mold, characterised in that at least one of the two parts of the mold comprises at least one means for local deformation of a sheet that is present in the mold in its closed state, the one or each means comprising one piece of hollow molding with a peripheral edge, which can be connected selectively to a source of suction or placed in depression and can be displaced between, on the one hand, a folded position, in which the molding piece is situated in close proximity with the wall of the thermoformed piece, even in withdrawal or at most close to touching the surface of the part of the mold carrying the local deformation piece and, on the other hand, a deployed position, in which the mold piece is applied under pressure with its peripheral edge against the wall of the thermoformed piece upholding the other part of the mold.

The invention relates also to a manufacturing process using the aforementioned molding device.

BRIEF DESCRIPTION OF THE DRAWINGS

The invention will be better understood in view of the description that follows, based on a preferred form of embodiment, provided as an example without limitation and explained with reference to the annexed schematic drawings, in which the FIGS. 1 to 6 represent schematic cross-sectional views and in lateral elevation of a mold device according to the invention, illustrating the different consecutive operational stages of the manufacturing of one thin-wall piece in accordance with the process according to the invention, namely, respectively and successively.

DESCRIPTION OF EXAMPLE EMBODIMENTS

Figure 1:
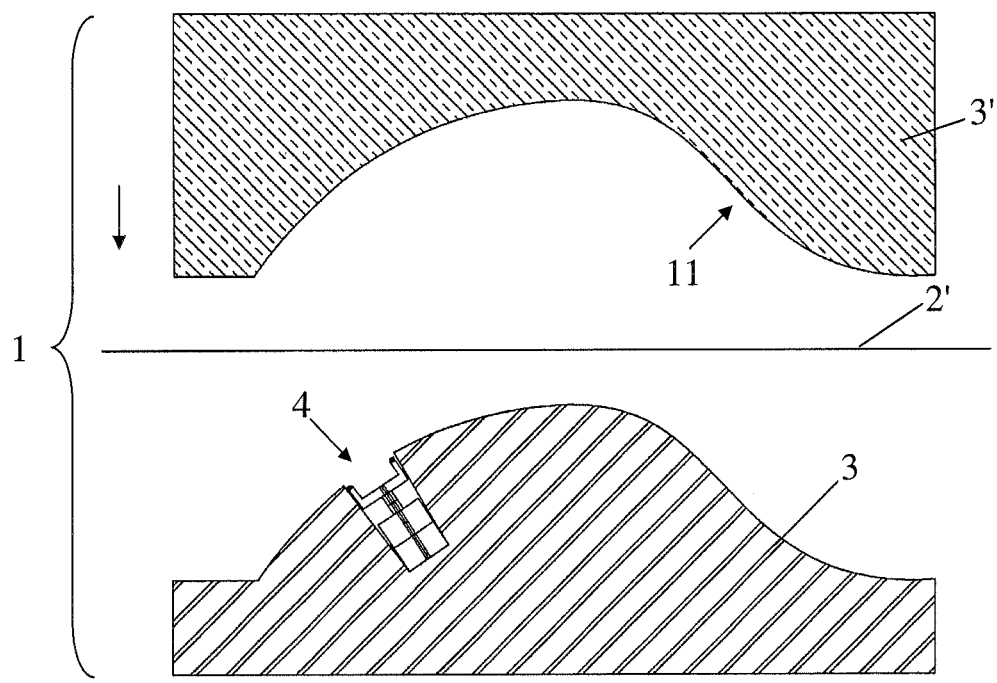
FIG. 1: The two parts of a mold are set aside (open and empty mold), putting in place the thermoplastic sheet, preferably preheated.
Figure 2:
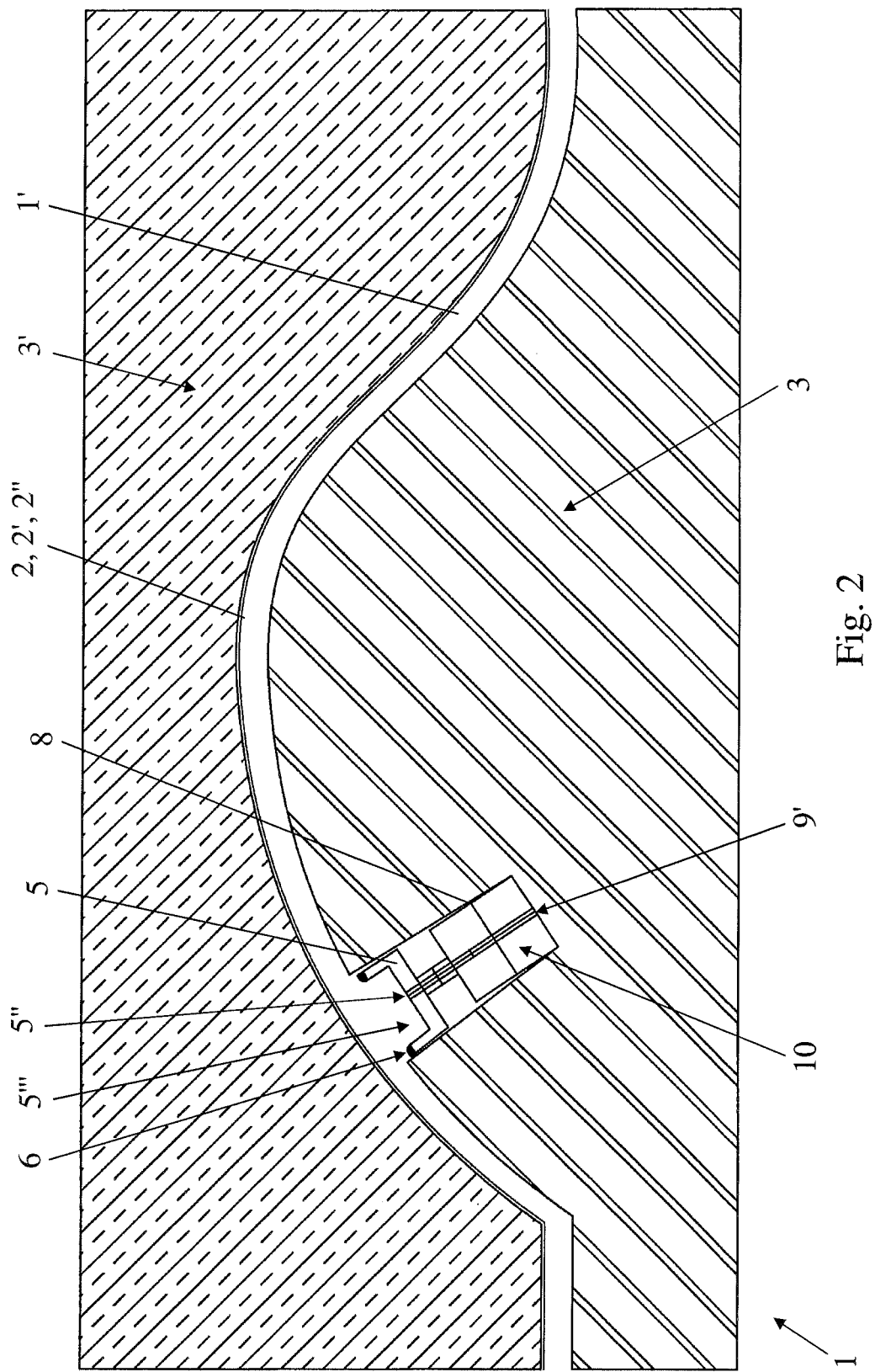
FIG. 2: Bringing closer the two parts of the mold (preforming the piece), then hermetic closing of the mold and performing the suction to conform the piece by close application against the upper part of the mold and eventually printing in relief a repetitive pattern (negative version of the pattern that is present on the surface of the upper part of the mold)
Figure 3:
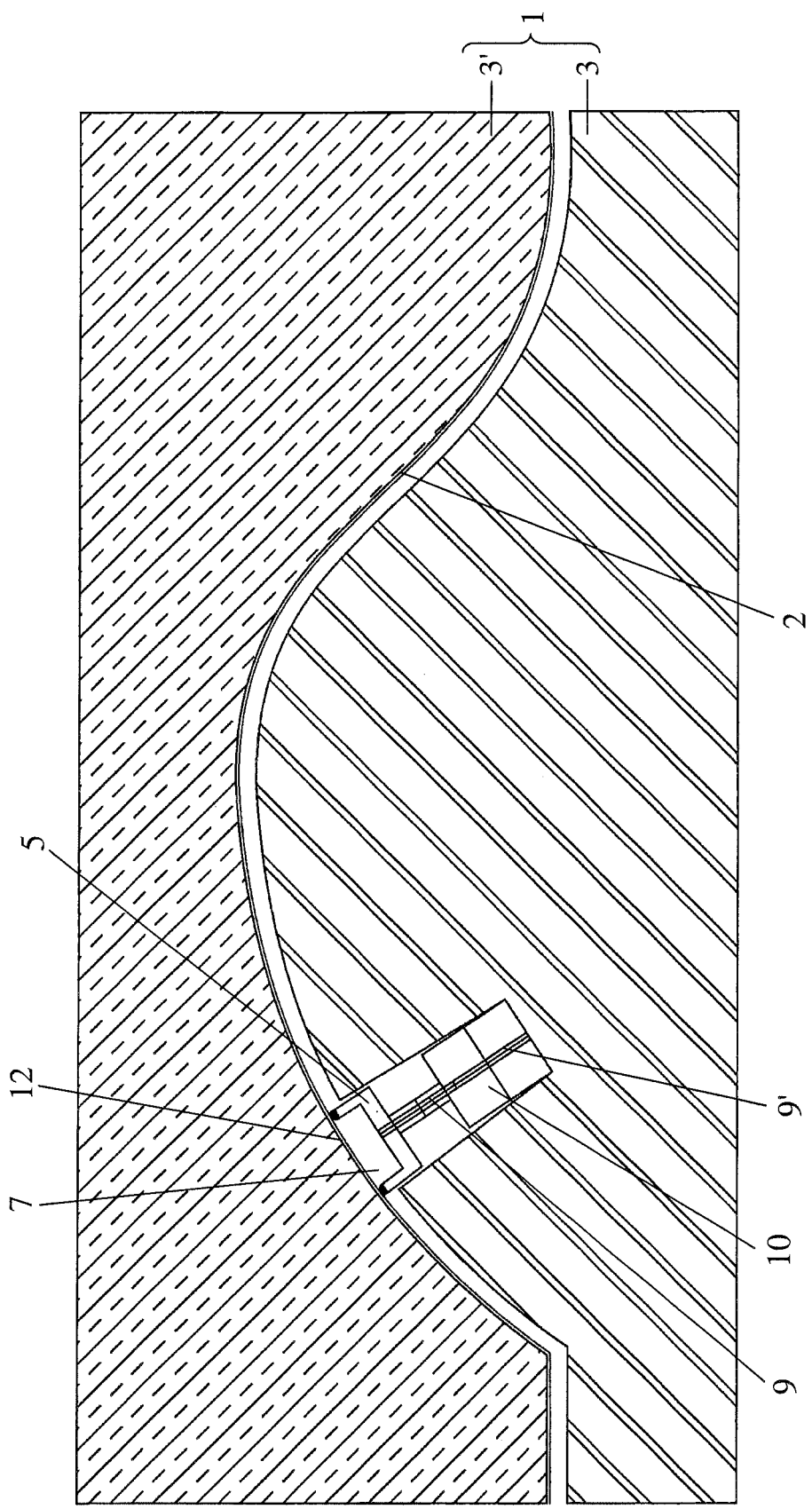
FIG. 3: Displacement in extension of the means of local deformation in contact with the conform piece/sheet.
Figure 4:
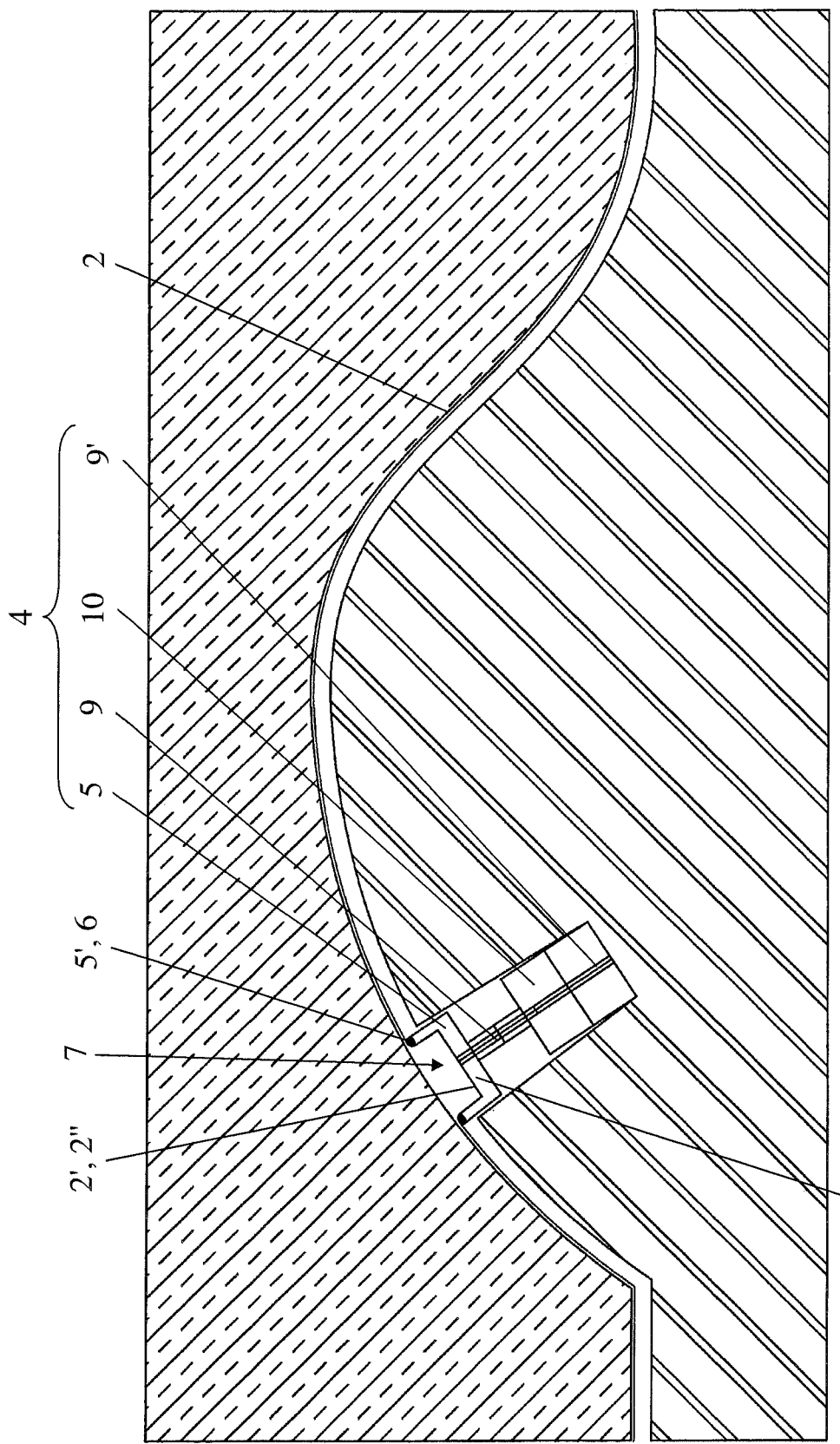
FIG. 4: Applying vacuum at the level of the means of local deformation (preferably after suppression of the vacuum at the level of the upper part of the mold)
Figure 5:
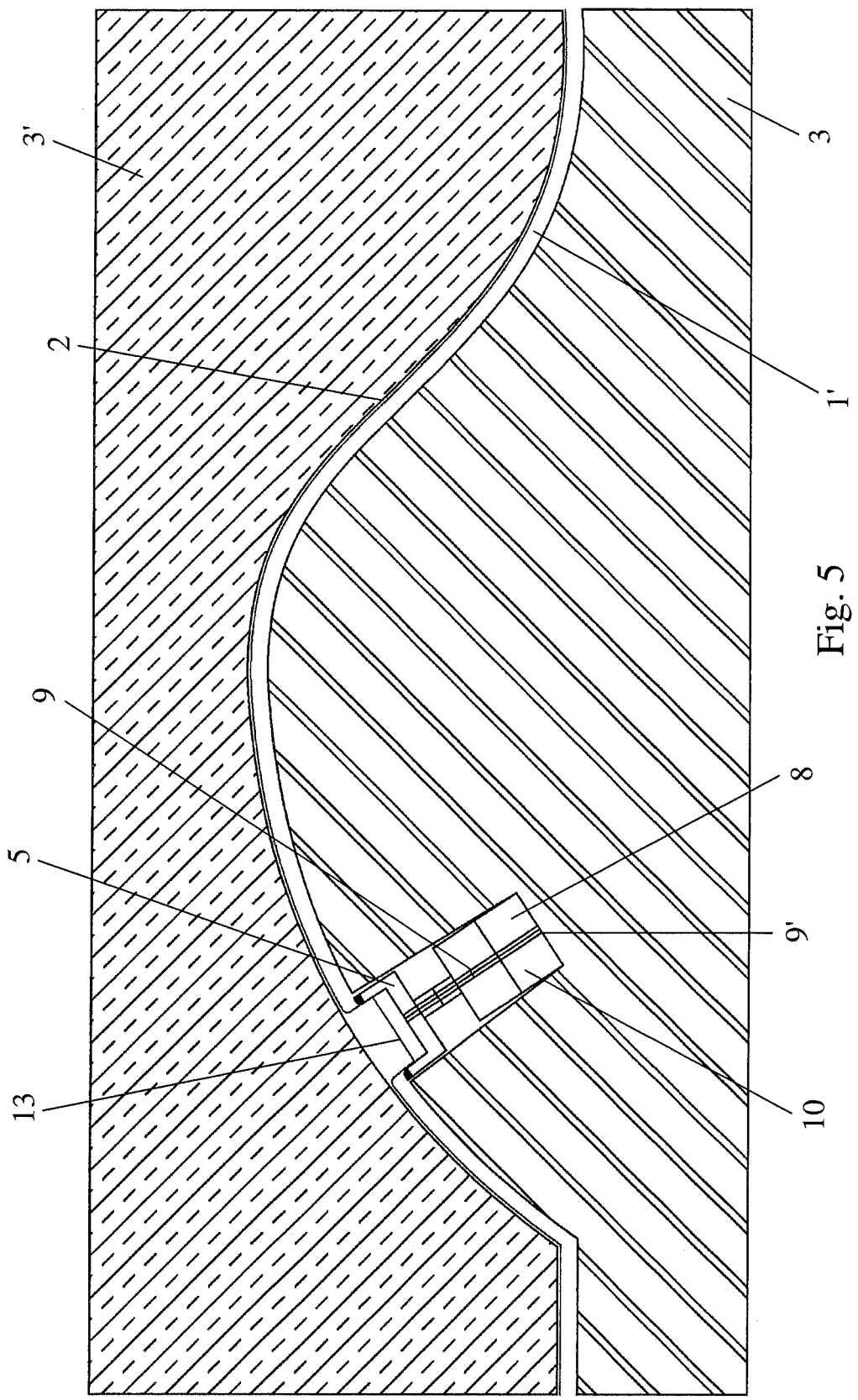
FIG. 5: Displacement in retraction of the means of local deformation in its retracted position (after having removed the vacuum or suppressed the suction at the level of the means of deformation)

The attached design figures show a thermoforming mold device for the realisation of a piece 2 with a thin wall 2" starting with a sheet 2 from thermoplastic material.

This mold device 1 comprises two parts of mold 3 and 3' (the upper and lower part in the shown example) with working surfaces in forms, which are substantially complementary and at least one of the parts is mobile in a way to define an opening state and a closing state of the mold. Moreover, one 3' of the two molding parts 3, 3' comprises means of suction for pressing the sheet 2 against its surface and the cavity 1' formed between the two parts of the mold 3 and 3' which are substantially hermetically sealed in the closed state of the mold.

To simplify the representations, the means for sealing, for suction under vacuum and for displacement of the parts of the mold 3, 3' are not shown in the attached figures.

In conformity with the invention, at least one 3 of the two parts of the mold 3, 3' comprises at least one means 4 of local deformation of a sheet 2' in the mold 3, 3' in its closed state, the one or each means 4 comprise one piece 5 of hollow molding with a peripheral edge 5', which can be connected selectively to a source of suction or placed in depression and can be displaced between, on the one hand, a folded position, in which the molding piece 5 is situated in close proximity with the wall 2" of the thermoformed piece 2, even in withdrawal or at most close to touching the surface of the part of the mold 3 carrying the local deformation means 4 and, on the other hand, a deployed position, in which the molding piece 5 is applied under pressure with its peripheral edge 5' against the wall 2" of the thermoformed piece 2 upholding the other part of the mold 3'.

The specialist understands easily that with the preceding arrangements it is possible to realise different versions of the same piece 2 with the same mold device 1, namely without any locally deformed zone 13, with one or some zone(s) 13 present, or also with the set of the preceding zones 13, while a plurality of means 4 is foreseen and no one, some or all of them are used during the manufacturing of the respective piece 2. Moreover, these different versions can be manufactured in the desired order and can be selected (or imposed by the commands) without any impact on the productivity or the output in term of manufactured pieces, except for the supplementary time that is necessary for obtaining the additional local deformation(s). Nevertheless, at least part of this duration is in any case necessary in order to permit a sufficient cooling-off of the piece 2 that is freshly formed in the mold.

In order to avoid any loss of depression locally, the peripheral edge 5' is equipped advantageously with a compression joint 5" permitting to delimit, during a contact under pressure, a chamber 7 substantially sealed with the wall 2" of the thermoformed piece 2.

In addition, the edge 5' presents a profile (in particular, an internal face with edge profile) adapted to the form that is searched for the edge 13' of the deformed zone 13, in particular at least slightly rounded or curbed in order to avoid the breaking of the sheet 2' and thus the wall 2" of the piece 2. In this way, the form of the edge 5' (actually the conformation of the internal side of this edge) determines the form of the edge 13' of the locally deformed zone 13 of the piece 2.

Although other designs are possible, it is advantageously foreseen that the piece of hollow molding 5 is mounted in a mobile manner, eventually with translational guiding in a recess 8 provided in the respective part of the mold 3, with the guiding being preferably ensured also in a deployed position of the molding piece 5.

According to a mode of embodiment of the invention, based on the attached FIGS. 1 to 6, the piece of hollow molding 5, advantageously in the form of a shell, is mounted on at least one axial support 9, preferably in an easily interchangeable manner, which presents a suction channel, or is traversed by a suction conduit 9' connected to at least one opening traversing 5" or to the secondary channels, made in the wall of the molding piece and ending at the internal conformation face 5''' of the molding piece 5.

According to a practical design variant, the bidirectional displacement of the piece of hollow molding 5 is realised by means of a pneumatic or hydraulic actuator 10, mounted and positioned on or in the part of the mold 3 receiving the piece of hollow molding 5, with the sliding guide of the piece 5 realised by the actuator 10 and/or by means of a special additional guiding structure.

The embodiment mode presented as an example in the attached figures shows only a single means 4.

Nonetheless, in a variant, which is not presented, at least two means of local deformation 4, mounted or not in the same part of the mold 3, 3' and activable selectively and independently, can be foreseen.

As illustrated also as an example in the FIGS. 1 to 6, the local deformation device(s) 4 is(are) installed on a first part of the mold 3, and the second part of the mold 3' presents a working surface with a repetitive pattern 11, namely a grainy surface, and is equipped with distributed suction means (not shown) permitting a close application by means of suction of the sheet 2' against the surface with a repetitive pattern 11.

To achieve a greater universality of the mold device 1, in particular greater polyvalence in terms of manufacturing of different versions of the piece 2, one or each piece of hollow molding 5 can be fixed in a detachable and interchangeable manner on the axial support 9 or the cylinder rod of the actuator 10.

The invention has also as object a process for manufacturing a piece 2 with a thin wall starting with a sheet 2' from thermoplastic material by the implementation of a device 1 of the mold already described above, with the piece 2 having to comprise or not at least one localised zone 13 with a special configuration.

This process consists in placing a sheet 2', eventually subjected to preheating, between the two parts of the mold 3 and 3', to close the mold in order to form a sealed cavity between the two parts of the mold, and eventually to preform the sheet 2' and then to conform the sheet by plastic deformation by applying it closely against the surface of one of the parts of the mold under the effect of suction or aspiration in a way to obtain the piece 2, and at the end to open the mold and extract the resulting thermoformed piece.

In conformity with the invention, this process consists, in addition, in realising, if need be, in a selective manner and depending on the version of the piece 2 to be obtained, at least one local deformation of the sheet 2', after the conformation of the sheet 2', by applying it against an additional one of the two parts of the mold 3, 3' and in a way that the latter is in a state permitting its plastic deformation, the one or each local deformation 13 being performed by means of suction of the respective portion of the sheet 12 in a piece of hollow molding 5 mounted in one of the two parts of the mold 3, 3' and displaced by applying it against the wall 2" of the sheet 2'.

According to one of the advantageous characteristics of the invention, the phase of realisation of a local deformation of the sheet 2' consists in performing the following operations:

Displacement of the piece of hollow molding 5 from its folded position to a deployed position in which it is supported under controlled pressure against the sheet 2' and thus forming the wall 2" of the piece 2;

Applying suction or realising a depression in the piece of hollow molding 5 in a way to deform locally the sheet 2' and press it closely against the surface of the internal face of the conformation 5''' of the molding piece 5;

Cutting off the suction or suppressing the depression;

Displacement of the piece of hollow molding 5 towards its folded position.

As an example, and in particular when the sheet 2 consists of material of the types polyethylene, polypropylene or polyvinyl chloride, the sheet 2 is preheated in order to be at a temperature of about 180° C. to 210° C. during the forming by suction phase, the subsequent optional phase of local deformation by means of the means 4 being performed while the material is still in a state, in which it can be plastically deformed, namely at a temperature of about 150° C. to 170° C.

In a context of optimised production control, the process can consist in manufacturing selectively, during a determined production period and depending on a production program resulting, for example, from a regrouping of client orders diversified in terms of the desired version of the piece 1, the pieces 2 comprising or non one or several local zone(s) 13 of special deformation or configuration.

In the preceding context, the process can, in addition, consist, between two cycles or programs for the manufacturing of the pieces 2 in different versions and having to present one or several of the zones 13 locally deformed in different configuration(s) and aspect(s), in interchanging one or several piece(s) of hollow molding 5.

Figure 6:
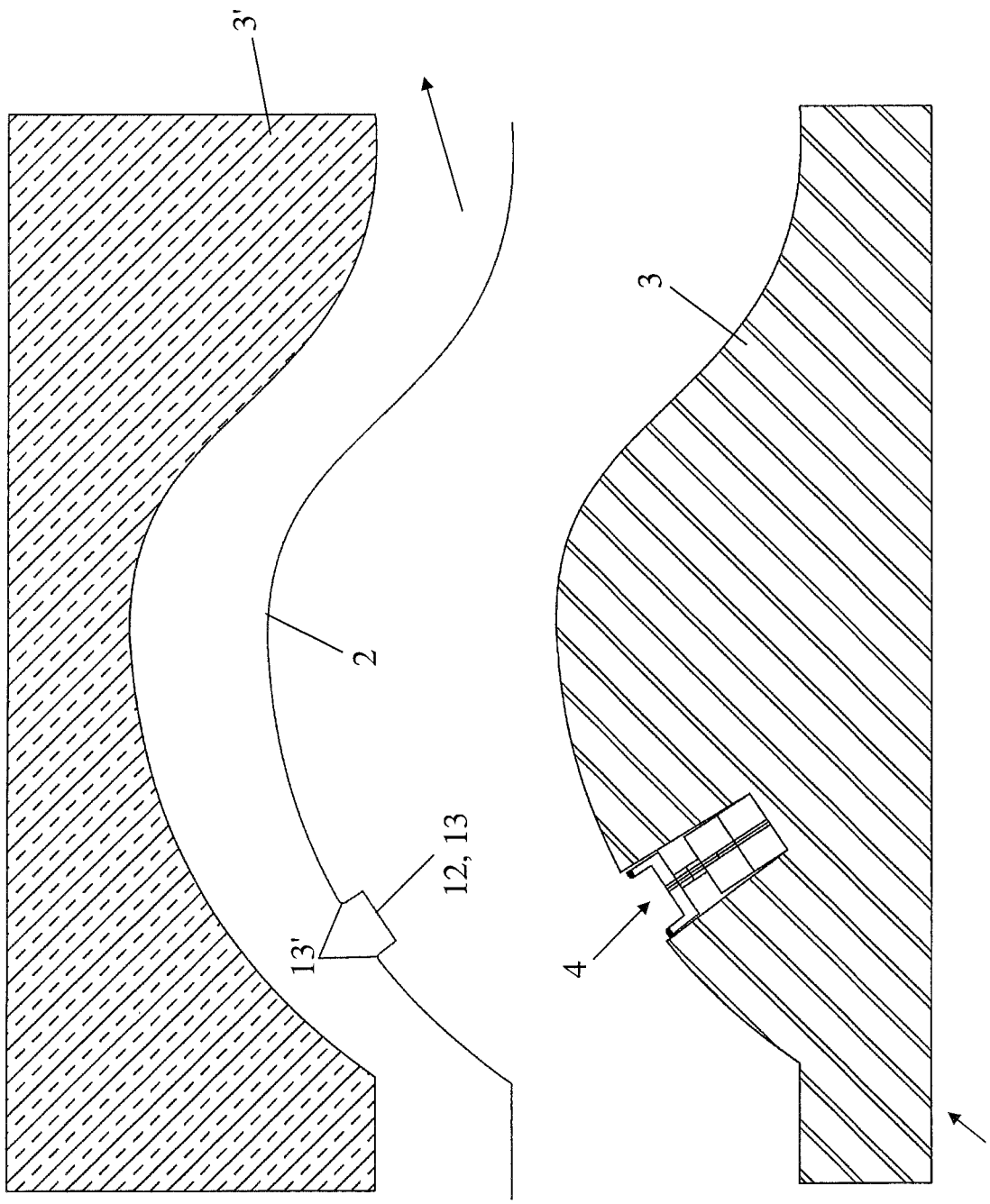
FIG. 6: Opening the mold and extraction of the molded piece.

And finally, as it is shown in FIG. 6, the invention relates also to a trim element or element of inner lining either formed by a thermoformed piece 2 with thin wall 2" or comprising an exposed face provided by such a piece 2. This piece 2 comprises at least a localised zone 13 presenting a local deformation of its wall 2" or a special local configuration, namely a hollow deformation, and preferably a repetitive pattern or relief 11 on the surface.

According to the invention, the thermoformed piece 2 is obtained by means of the previously described manufacturing process and comprises at least one hollow deformation 13 forming, for example, a recess for receiving an accessory as well as eventually a repetitive pattern in relief that is present on the entire surface of the piece 2.

Of course, the invention is not limited to the described mode of embodiment that is shown in the attached drawings. Modifications are possible, namely from the point of view of the constitution of the different elements or by substitution of equivalent techniques without leaving the domain of protection of the invention.

What is claimed is:

1. A process of manufacturing a thermoformed piece or wall starting with a sheet of thermoplastic material, said piece or wall optionally having at least one locally deformed zone, the process including:

1) heating the sheet,
2) placing the sheet between two parts of a thermoforming mold device, one part of the thermoforming mold device comprising a local deformation device including a piece of hollow molding having at least one localized zone presenting a particular configuration,
3) closing the mold by bringing closer the two parts of the mold,
4) conforming the sheet by plastic deformation of the sheet by applying the sheet to the surface of one of the parts of the mold under the effect of suction or aspiration,
5) optionally performing at least one local deformation on the sheet after the conforming of the sheet while the sheet is still in a state permitting its plastic deformation, in order to produce the thermoformed piece, the at least one local deformation being performed by suction of a portion of the sheet into the piece of hollow molding, said piece of hollow molding being mounted in one of the two parts of the mold and displaced, the displacement including applying the piece of hollow molding against the sheet and/or away from it, and
6) opening the mold, and extracting the resulting thermoformed piece.

2. The manufacturing process according to claim 1, including the step of performing at least one local deformation on the sheet, wherein after conforming the sheet by plastic deformation by applying the sheet to the surface of one of the parts of the mold under the effect of suction or aspiration, the suction or aspiration is then switched off before the following step of performing at least one local deformation on the sheet by suction of the portion of the sheet in the piece of hollow molding mounted in one of the two parts of the mold and displaced.

3. The manufacturing process according to claim 1, including the step of performing at least one local deformation on the sheet, wherein the at least one local deformation of the sheet includes the following operations:

displacement of the piece of hollow molding from a folded position to a deployed position in which the hollow molding is supported under controlled pressure against the sheet;

applying suction or providing a depression in the piece of hollow molding to deform locally the sheet and press the sheet closely against the surface of an internal conformation face of the piece of hollow molding;

cutting off the suction or suppressing the depression; and displacing the piece of hollow molding towards its folded position.

4. The manufacturing process according to claim 1 including repeating steps (1)-(6) to manufacture selectively, during a determined production period, a plurality of the pieces each comprising said at least one locally deformed zone.

5. The manufacturing process according to claim 1 including a plurality of cycles each including steps (1)-(6) for manufacturing a plurality of the pieces having different configurations, wherein between two cycles the process includes changing the piece of hollow molding.

\* \* \* \* \*